United States Patent [19]

Vissing

[11] Patent Number: 4,697,370
[45] Date of Patent: Oct. 6, 1987

[54] FISHHOOK THREADER

[76] Inventor: E. D. Vissing, P.O. Box 437, Idaho Falls, Id. 83402

[21] Appl. No.: 855,501

[22] Filed: Apr. 23, 1986

[51] Int. Cl.[4] .......................................... A01K 97/00
[52] U.S. Cl. ...................................................... 43/1
[58] Field of Search ................. 43/1, 4, 57.1; 223/99; 284/17; 7/106

[56] References Cited

U.S. PATENT DOCUMENTS

| | | |
|---|---|---|
| 242,288 | 5/1881 | Farrell . |
| 694,984 | 3/1902 | Olson . |
| 746,091 | 12/1903 | Johnston . |
| 1,147,656 | 7/1915 | Spear . |
| 2,120,571 | 6/1938 | Reichenstein et al. . |
| 2,166,585 | 7/1939 | Evans . |
| 2,518,287 | 8/1950 | Costello . |
| 2,601,605 | 6/1952 | Eulvio . |
| 2,682,126 | 6/1954 | Shepherd . |
| 2,783,571 | 3/1957 | Stilwell . |
| 2,800,262 | 7/1957 | Appel ................................... 223/99 |
| 2,804,710 | 9/1957 | Stilwell . |
| 3,000,545 | 9/1961 | Ullisperger ........................... 223/99 |
| 3,357,086 | 12/1967 | Hood ..................................... 223/99 |
| 3,588,078 | 6/1971 | Van DeSande . |
| 3,965,605 | 6/1976 | Allen . |
| 4,029,346 | 6/1977 | Browning ............................. 289/17 |
| 4,050,176 | 9/1977 | Asper . |
| 4,557,408 | 12/1985 | Biemans ................................ 223/99 |

FOREIGN PATENT DOCUMENTS 16350 of 1899 United Kingdom ................. 223/99

Primary Examiner—M. Jordan
Attorney, Agent, or Firm—Wells, St. John & Roberts

[57] ABSTRACT

A fishhook threader for threading leader through the eye of a fishhook. The threader has a body with an aperture through one end for guiding the end of the leader along a prescribed path through the body. The threader also has an aperture for receiving the hook so that the eye is across the leader path. Mounted on the body are a gripping end and an alignment punch for holding and accurately centering the eye of the fishhook with respect to the leader path.

11 Claims, 16 Drawing Figures

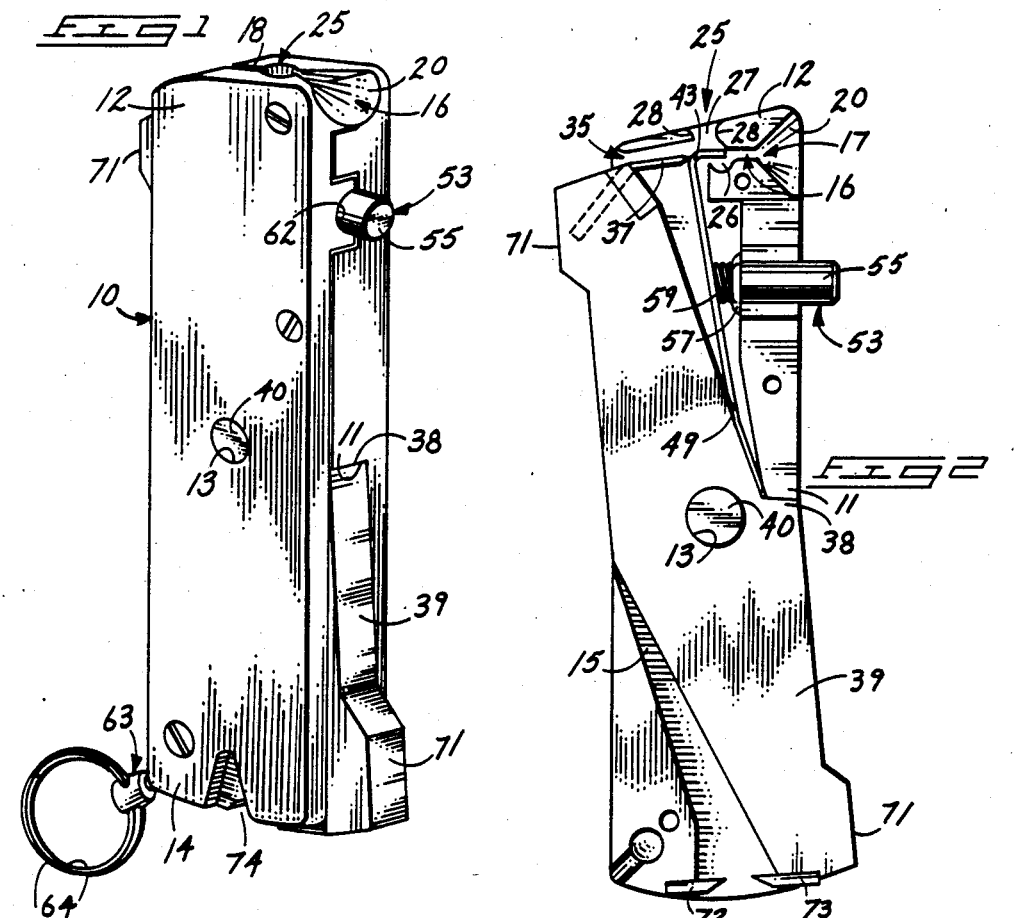

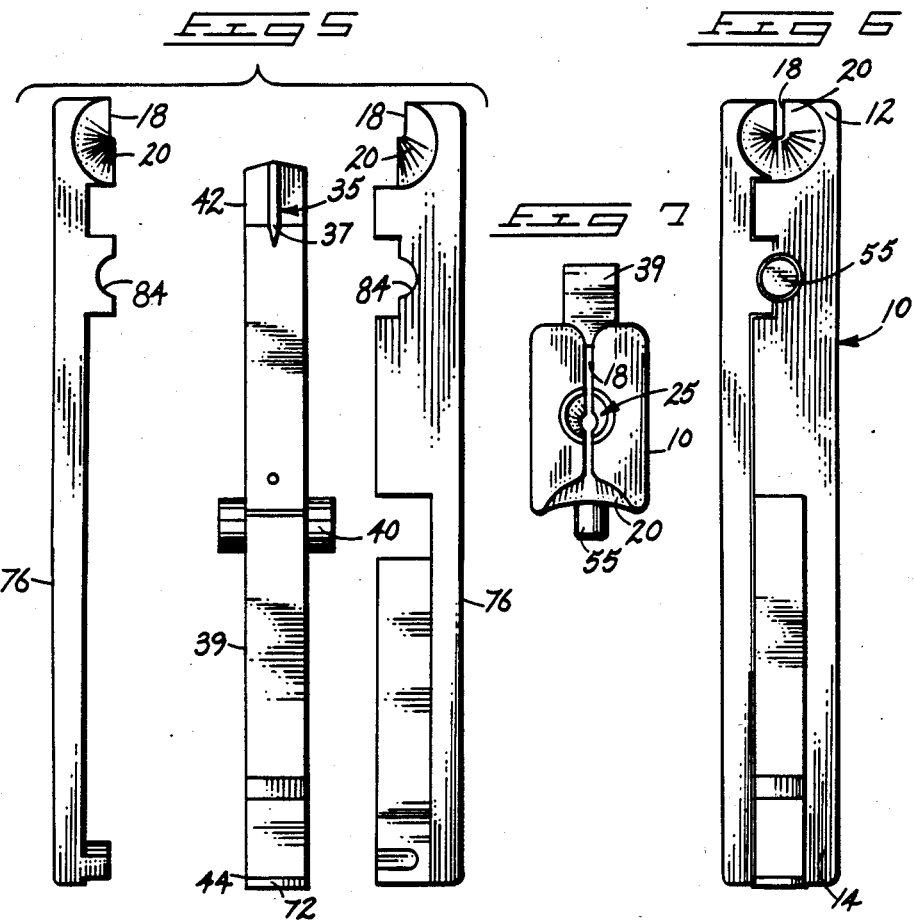

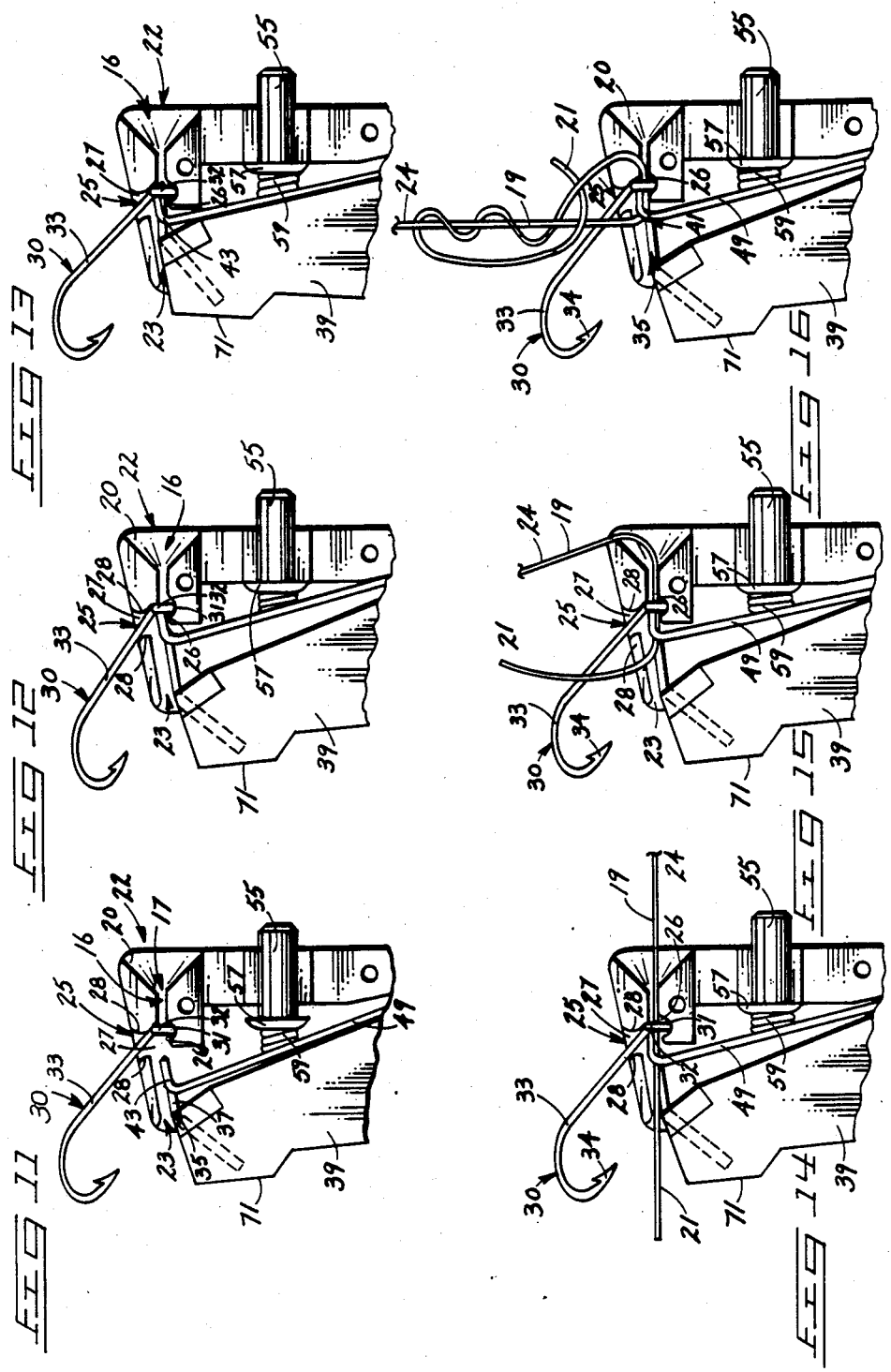

FISHHOOK THREADER

FIELD OF THE INVENTION

This invention relates to a fishhook threader for threading a leader through the eyes of fishhooks.

BACKGROUND OF THE INVENTION

It is often necessary for fisherman to tie fishhooks to fishing leaders when they are in the field fishing. This may be necessary to replace a hook which was lost, or to simply change the size or type of hook which is being used. This is particularly true in in the case of fly fishermen, since they often change the type of fly which they are using.

It is often difficult for a fisherman to thread a leader through the eye of a fishhook because of the size of the eye and the conditions under which the hook is being threaded. In the case of fly casting, the hooks used for the flies are often very small and have extremely small eyes through which the leader must be threaded. Manually threading a leader through such small eyes requires close attention, very steady hands and good eye sight.

In addition, in the case of a fly which has not been previously attached to a leader, there is very often lacquer used in forming the fly which has spread across the eye of the hook, blocking the eye and preventing passage of the leader through it.

The conditions under which a fisherman is attempting to attach a hook to a leader can affect the fisherman's ability to thread the leader through the eye of the hook. Very often, especially in the case of fly fishermen, the fisherman may be standing on extremely slippery footing, such as in the middle of a stream which would make it very difficult for him to hold the fishhook eye and leader steady.

Because of these reason, it would be advantageous for fishermen to have a threader which would hold the fishhook eye and guide the leader through it. With such a device a fisherman could thread a hook without having to do it through precise positioning of the hook and the leader with his hands.

One attempt to create such a device is shown in U.S. Pat. No. 2,682,126 to E. F. Shepherd. The Shepherd patent shows a pair of blocks with complementary faces resiliently held together. The device has different sized apertures through one side into which two different sized hooks may be inserted. When the hooks are inserted, the eyes can be manually aligned transversely across a narrow passageway through which the leader can be threaded. The narrow passageway for the leader has a flared cone-shaped outer end into which the leader is initially inserted. The cone-shaped outer portion of the aperture through which the leader is inserted accomplishes one of the desired objectives of a fishhook threader in that it guides the leader through the eye of the hook.

There are several drawbacks to the Shepherd device. First of all, there are only two openings through which different sized fishhooks may be inserted. If the fishhooks are larger than the openings, they cannot be threaded using this device. If the hooks are very much smaller than the opening, they will be so loosely held in the apertures that it will be necessary to hold the hook in its proper position with an extra hand in order to get the leader threaded through it.

There is no provision in the Shepherd device for clearing the eye of the fishhook of any lacquer which may be blocking it. Another disadvantage is that to actually tie the knot in the leader to affix the leader to the fishhook, the leader and the hook must be removed from the device by separating the two blocks. In the Shepherd device, the eye of the fishhook must be accurately aligned across the leader aperture by hand. The Shepherd device has no positive clamping mechanism to hold the eye of the hook in its aligned positioned across the leader path.

A second device for threading fishhooks is shown in U.S. Pat. No. 2,783,571 to Stilwell, In the Stilwell device, a fishhook is held in a slot through the use of permanent magnets. A pair of permanent magnets at each edge of the fishhook slot are intended to hold the eye of a fishhook across a tapered slot through which the leader can be inserted. While this device guides the leader through the eye of the fishhook, there is no positive locking mechanism which holds the eye of the fishhook accurately across the leader opening. If the fishhook or the device is jarred during the threading process, the hook can move within the device and the eye will no longer br properly lined up with the leader threading aperture. There is nothing which accurately centers the eye of the hook across the tapered slot. In addition, the Stilwell device does not show anything to ensure that the eye of the hook is clear of lacquer or other material prior to threading it. There is also no way to form an easily tied knot, such as a stevedore's knot, without removing the fly and the leader from the device.

None of the prior art fishhook threaders have means for accurate alignment and centering of the eye of the fishhook across the opening through which the leader is guided so as to allow the leader to pass through the eye of the fishook without requiring fine manual dexterity.

BRIEF DESCRIPTION OF THE DRAWINGS

A preferred embodiment of the invention is illustrated in the accompanying drawings, in which:

FIG. 1 is a perspective view of the device for threading a leader through the eye of a fishhook;

FIG. 2 is a side elevational view of the device with one side of the body removed;

FIG. 3 is a side elevational view showing the inside face of one side of the body;

FIG. 4 is a side elevational view showing the inside face of the other side of the body;

FIG. 5 is an exploded view of the two sides of the body and the elongated pivoting member mounted between them;

FIG. 6 is a front elevational view of the parts shown in FIG. 5 as they are in position in the device;

FIG. 7 is a top view of the device;

FIG. 8 is a side view of a spring clamp;

FIG. 9 is a front view of the spring clamp shown in FIG. 8;

FIG. 10 is an end view of the spring clamp shown in FIG. 8; and

FIGS. 11 through 16 are partial cross-sectional operational views showing the operation of the preferred embodiment.

DETAILED DESCRIPTION OF THE PREFERRED EMBODIMENT

In compliance with the constitutional purpose of the Patent Laws "to promote the progress of science and useful arts" (Article 1, Section 8), applicant submits the following disclosure of the invention.

The instant invention arose out of the need for a simple compact and easily usable fishhook threader for threading leader through the eyes of fishhooks. The need is particularly acute in the case of fly fishermen, who are very often changing the type of flies they are casting. They are often fishing under conditions of inclement weather, or are physically located in places such as the middle of streams which have slippery and unstable footing. It is also desirable that the fishhook threader be held and manipulated using only one hand, leaving the other hand free to handle the leader and the fishhook.

Another desirable feature of a fishhook threader is that it can be usable with a wide variety of hook sizes, without the necessity of changing threaders or parts of threaders.

The fishhook threader is intended to be used by fishermen to thread a leader through the eye of a fishhook. The fishhook is generally shown in the accompanying drawings, FIGS. 11 through 16, with the reference number 30. The fishhook 30 has an eye 31. The eye 31 is defined by a pair of curved eye sides 32. The eye is attached to, or formed at the end of the shank 33. At the opposite end of the shank 33 is the point 34.

The leader 19 is also shown in FIG. 11 through FIG. 16. When inserted through the eye 31 it has what will be referred to herein as a free end 21 and a standing end 24. The free end 21 is inserted through eye 31.

The fishhook threader is generally shown in perspective in FIG. 1 and in a partially exploded view in FIG. 2. The threader has a body 10. The body 10 has a threading end 12 and a cutting end 14. There is an aperture 16 formed through the body 10 for guiding the leader 19 along a prescribed leader path 17 through body 10. A hook receiving means 25 is provided on the body 10 at the threading end 12 into which hook 30 is inserted for threading. The hook receiving means 25 receives and orients the eye 31 of hook 30 transversely across leader path 17.

An alignment means 35 is movably mounted on the body 10 for movement from an inoperative position away from hook receiving means 25 to an operative position intersecting the hook receiving means 25, along prescribed leader path 17. In the operative position the alignment means 35 projects through the fishhook eye 31 to accurately align the eye 31 with respect to the leader path 17.

The threader also has gripping means 41 for releasably holding the eye 31 across the prescribed leader path 17. Gripping means 41 is movably mounted on the body 10, and is movable from a release position away from the hook receiving means 25 to a gripping position to engage fishhook 30 and retain fishhook 30 stationary in hook receiving means 25. When gripping means 41 is moved to the release position the fishhook 30 can be inserted or removed from hook receiving means 25.

Mounted on the body 10 is release means 53. Release means 53 is operatively connected to the gripping means 41 for movement of the gripping means 41 from the gripping position to the release position. Release means 53 is actuated by the hand of the user when he wishes to insert or remove the fishhook 30 from hook receiving means 25.

As illustrated in FIG. 2 and FIG. 4, the threader also has a cutting means 70 mounted to cutting end 14 of body 10. It includes a set of jaws, at least one of which is movably mounted for movement from an open position to a closed cutting position. The cutting means 70 is used to cut excess from leader 19.

The threader is also provided with attaching means 63 which is connected to body 10 so that the threader can be conveniently attached to the clothes or equipment of the fisherman. A split-ring fastener is illustrated in FIG. 1, but other suitable attachment means could be utilized.

In the preferred embodiment as illustrated in FIGS. 1, 2, 3, 4, 5, and 6, the body 10 is elongated. The elongated shape of body 10 provides a convenient shape to be easily held in one hand. All the movements of the parts of the threader necessary to its operation can be accomplihed using one hand. Since only one had is required to hold and operate the threader, the other hand is freed and can be used to handle the fishhook 30 and the leader 19.

The aperture 16 which guides the leader 19 along leader path 17 is formed through the threading end 12 of the body 10. It has a flared portion on the body 10 formed by converging surfaces 20. The converging surfaces 20 form an entrance 22 to the hook receiving means 25 for leader 19, while an exit 23 is formed on the opposite side of the body 10 extending from the hook receiving means 25.

As shown in FIG. 6 and FIG. 7, the threading end 12 of body 10 also has a slot 18 which communicates with aperture 16. The slot 18 extends inwardly through threading end 12 into aperture 16. As will be explained more fully later, the slot 18 provides a convenient means for removing leader 19 from aperture 16 after it has been threaded through eye 31. While the communicating slot 18 is shown in the preferred embodiment, the aperture 16 could also be a closed aperture, with a hinged portion being provided on body 10 to allow removal of the leader 19.

The body 10 has a longitudinal cavity 15 which extends between the threading end 12 and the cutting end 14. The body 10 has an elongated actuation member 39 pivotally mounted in cavity 15. Actuation member 39 is retained in cavity 15 by pivot pin 40, which extends through pivot holes 13 formed in the body 10. The body 10 also has a button passage 62 extending outward from cavity 15, through which rElease means 53 extends.

Actuation member 39 has an aligning end 42 and a cutter end 44. Actuation member 39 also has two finger engaging surfaces 71 which protrude outwardly from cavity 15 and engage parts of the user's hand when the threader is held. The surfaces 71 enable the user to conveniently and easily manipulate the actuation member using one hand.

Formed on one side of actuation member 39 is a shoulder 38. The shoulder 38 engages a complementary should 11 which is formed at one edge of cavity 15 on body 10. Shoulders 11 and 38 limit the amount of pivotal motion of actuation member 39 in one direction.

Also mounted in cavity 15 of body 10 is a leaf spring 49. Leaf spring 49 may be attached to body 10 or to elongated member 39, as shown in FIG. 2.

As shown in FIGS. 3, 4, and 5, the body 10 may be made up of separate side pieces 76 and 77. Side pieces 76 and 77 each have complementary grooves which form aperture 16 when the side pieces are positioned together. The side pieces 76 and 77 also have the flared complementary converging surfaces 20 which form the cone-shaped entrance 22 to leader path 17 defined by aperture 16. They have complementary semi-circular cavities 82 and 83 which form eye cavity 26. Complementary grooves 79 formed in each side piece 76 and 77 form a hook receiving throat 27 and hook receiving entrance. The side pieces 76 and 77 also have complementary semi-circular recesses 84 which form button passage 62.

The hook receiving means 25 on body 10 as shown in FIG. 2 extends inwardly to and intersects aperture 16. The hook receiving means 25 includes the eye cavity 26. The eye cavity 26 intersects and extends inward through aperture 16 so that it lies across the preferred leader path 17. The hook receiving means also has an entrance defined by semicircular flared shoulders 28, which also define throat 27. The shoulders 28 guide the eye 31 into the eye cavity 26.

The eye cavity 26 provides a base into which a portion of eye 31 fits. The cavity 26 assists in receiving and orienting the eye 31 transversely across the prescribed leader path 17.

Mounted to body 10 is an alignment means 35 shown in FIGS. 2 and 5, and in FIGS. 11 through 16. In the preferred embodiment, the alignment means includes a tapered punch 37. Tapered punch 37 is attached at the aligning end 42 of actuation member 39 and is moved therewith. Since shoulders 11 and 38 limit the pivoting motion of actuation member 39, tapered punch 37 moves between the inoperative position shown in FIG. 2 and the operative position shown in FIG. 13 within the body 10 to prevent damage to tapered punch 37.

When in its operative position as shown in FIG. 13, the tapered punch 37 is aligned with the prescribed leader path 17 and projects through the eye cavity 26 to accurately align the fishhook eye 31 with the prescribed leader path 17. In its inoperative position the tapered punch 37 is retracted from the eye cavity 31.

The gripping means 41 is generally illustrated in FIGS. 8, 9, and 10. It includes a gripping head 43. The gripping head 43 has a pair of fingers 45 separated by a slot 47. The gripping head 43 is movable from a release position away from the eye cavity 26 to a holding position within the eye cavity 26 contacting the eye 31. The fingers 45 engage the eye sides 32 to hold the fishhook 30 stationary and to prevent the fishhook from rotating when leader 19 is being threaded through it. The slot 47 allows leader 19 to be lifted free of gripping head 43 after insertion through eye 31.

Gripping head 43 is mounted at one end of the leaf spring 49. Leaf spring 49 supports the gripping means 41 and biases it in to the gripping position. Leaf spring 49 has an opening 51 adjacent gripping means 41 through which alignment means 35 protrudes when alignment means 35 is moved to the operative position. While in the preferred embodiment as shown the gripping head 43 is integrally formed with leaf spring 49, it could alternatively be a suitable separate element attached to the end of leaf spring 49 or to a separate spring element.

The release means 53 includes a hollow button 55 protruding through the button passage 62 extending through the body 10 to cavity 15. A coil spring 59 partially fits within and biases button 55 outward as shown in FIG. 1 and FIG. 2. Flange 57 is provided on button 55 to retain button 55 in button passage 62. By pressing inward on button 55, one is able to move gripping head 43 away from eye cavity 26.

The cutting means 70 includes a movable jaw 73 which is attached to the cutter end 44 of actuation member 39. It also includes a fixed jaw 72 mounted at the cuttng end 14 of body 10. A notch 74 is formed through body 10 adjacent cutting means 70 so that leader 71 may be easily inserted between fixed jaw 72 and movable jaw 73.

The operation of the hook threader is illustrated in FIGS. 11 through 16. During the operation as described below, the threader will normally be held in and operated by one hand, while the hook 30 and leader 19 are handled by the other hand.

Because of the elongated shape of body 10, the threader can be conveniently oriented for ease of operation in one hand. As an example, the body 10 can be oriented so that button 55 is oriented in the direction of the thumb, and finger engaging surface 71 at the aligning end 42 of elongated member 39 would be in close proximity to the fingers. One operation, such as depressing button 55 to move gripping head 43 away from the hook receiving means, could be accomplished with the thumb or the "V" between the thumb and fingers. The hook 30 could then be handled with the other hand and placed in position as shown in FIG. 11.

FIG. 2 shows the inoperative, or starting position of the threader. Elongated member 39 is biased outwardly by leaf spring 49 so that the tapered punch 37 is away from the eye cavity 26.

At the same time, leaf spring 49 is biasing the gripping head 43 into the eye cavity 26. With the gripping head 43 in this position the eye 31 cannot be inserted into eye cavity 26.

The first step in operation of the threader is shown as accomplished in FIG. 11. Buttun 55 is depressed, compressing coil spring 59, and moving the gripping head 43 away from eye cavity 26. With gripping head 43 in this position, the hook 30 is inserted between flared shoulders 28 so that eye 31 rests in eye cavity 26. In this position, the eye 31 of hook 30 is oriented transversely across aperture 16, and thus across leader path 17.

In FIG. 12, the next step of operation is shown. Button 55 is released. Releasing button 55 allows leaf spring 49 to move in the direction of button 55, which in turn moves gripping head 43 in the direction of the eye cavity 26. As leaf spring 49 moves the gripping head 43 toward the eye 31 of hook 30, the fingers 45 of gripping head 43 engage eye sides 32, firmly holding the eye 31 transversely across leader path 17.

As illustrated in FIG. 13, the next step would be to exert pressure with one or more fingers against the aligning end 42 of actuation member 39, causing it to pivot. This moves tapered punch 37 toward the eye 31 of hook 30, with the tapered punch 37 moving along leader path 17. As the tapered punch contines to move toward the eye 31, it eventually projects through the eye 31. As the tapered punch 37 projects through eye 31, it accurately centers the eye 31 with respect to leader path 17. Projecting tapered punch 37 through the eye 31 also clears any foreign material such as lacquer from the eye 31.

The pressure against the aligning end 42 of actuation member 39 is then relaxed, allowing leaf spring 49 to bias the aligning end 42 of elongated member 39 outwardly from the eye cavity 26, causing tapered punch 37 to move away from eye 31 as it is held in eye cavity 26. Tapered punch 37 continues moving away from eye cavity 26 until it has reached its inoperative position, which is shown in FIG. 11.

The next step is to insert free end 21 of leader 19 through aperture 16, as shown in FIG. 14. The hook threader is held in one hand while the leader 19 is held in the other hand. The free end 21 of leader 19 is inserted between converging surfaces 20 which define entrance 22 to aperture 16. Because of the flared circular nature of the converging surfaces 20, the free end 21 of leader 19 is directed inwardly toward the center of converging surfaces 20 so that it is easily inserted through aperture 16 along leader path 17. As is also shown in FIG. 14, the gripping head 43 has been maintained in position against the sides 32 of eye 31, so that eye 31 has been held in a stationary position centered transversely across leader path 17. With the ability of gripping head 43 to hold eye 31 in a stationary position, free end 21 of the leader 19, will automatically pass through eye 31 once the free end 21 has been inserted into aperture 16.

The free end 21 will also pass through slot 47 of gripping head 43 and opening 51 of leaf spring 49. The gripping head 43 is still holding eye 31 of hook 30 in a stationary position in eye cavity 26 while the leader 19 is being positioned as shown in FIG. 15. After the leader has been inserted along prescribed leader path 17 through body 10 and eye 31 and out exit 23, the ends of the leader 19 are grasped and pulled outwardly through slot 18 and slot 47 as illustrated in FIG. 15. Once the ends of leader 19 have been removed as shown in FIG. 15, they are held in one hand while the body 10 is rotated by the other hand to wrap the ends of leader around one another three or more times. The free end 21 of leader 19 is then inserted through the first loop, as shown in FIG. 16. This creates a stevedore's knot, which is a very common knot used by fly fishermen in tying flies to fishing leaders. The ends of the leader are then pulled, tightening the knot. Button 55 is then depressed once again as shown in FIG. 11. This moves leaf spring 49 and gripping head 43 away from eye cavity 26, releasing the eye 31, and the hook 20 which has been attached to leader 19 can be removed from the hook receiving means 25.

The remaining excess amount of the free end 21 of leader 19 is placed between fixed jaw 72 and movable jaw 73 through notch 74. Pressure is be applied against finger-engaging surface 71 at the cutter end 44 of actuation member 39, which closes the fixed jaw 72 and movable jaw 73, severing the excess amount of leader.

The operation of the fishhook threader as just described can be accomplished with the threader being held in and manipulated with one hand, and the hook and then the leader being held in the other. It is possible to accomplish all of the steps as outlined above with the fishhook threader still attached to the clothing of the fisherman.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A fishhook threader for theading leader through the eye of a fishhook, the fishhook having a shank and an eye at one end thereof, the eye being angularly bent relative to the shank, the threader comprising:

a body having an aperture for guiding the leader along a prescribed leader path through the interior of the body;

hook receiving means on said body to receive and orient the eye transversely across the prescribed leader path, the hook receiving means including an eye receiving cavity positioned across the prescribed leader path;

releaseable gripping means movably mounted on the body for positively locking the eye within the eye receiving cavity, the gripping means being selectively operable between a first gripping position and a second release position, the gripping means preventing the eye from being removed from the receiving cavity when in said first position;

alignment means separate from and movable with respect to the gripping means for accurately centering the eye within the receiving cavity with respect to the prescribed leader path, the alignment means being movable from an operative aligning position projecting through the eye when performing an aligning function to an inoperative position removed from the eye to permit threading of leader through the eye, the gripping means maintaining proper centering alignment of the eye within the receiving cavity with respect to the prescribed leader path after the alignment means has been moved from the operative to the inoperative position.

2. The fishhook threader of claim 1, further comprising:

release means operatively connected to the gripping means for moving the gripping means to said second position to release the eye to enable the threaded eye to be removed from the hook receiving means.

3. The fishhook threader of claim 1, further comprising:

release means operatively connected to the gripping means for moving the gripping means to said second position to release the eye to enable the threaded eye to be removed from the hook receiving means; and wherein the body has an inward slot communicating with the aperture for removal of the leader after the leader is threaded through the eye.

4. The fishhook threader of claim 1, further comprising:

cutter means mounted on the body for movement from an open position to a closed position for cutting the leader.

5. The fishhook threader of claim 1, further comprising:

release means operatively connected to the gripping means for moving the gripping means to said second position to release the eye to enable the threaded eye to be removed from the hook receiving means;

biasing means mounted on said body for resiliently positioning the alignment means in the inoperative position; and wherein the body has an inward slot communicating with the aperture for enabling ready removal of the leader after the leader is threaded through the eye.

6. The fishhook threader of claim 1, further comprising:

a biasing spring mounted on the body for resiliently positioning the alignment means in the inoperative position.

7. The fishhook threader of claim 1 wherein the gripping means comprises a spring biased, bifurcated clamp for grasping diametrically opposed portions of the eye for holding the eye within the eye receiving cavity.

8. A fishhook threader for threading leader through the eye of a fishhook, comprising:
   an elongated body, having a threading end and a cutting end, the body having (1) a slotted aperture through the threading end for guiding the leader along a prescribed leader path through the interior of the body at the threading end and (2) a longitudinal cavity formed therethrough;
   hook receiving means formed in the threading end of the body to receive and orient the eye transversely across the prescribed leader path, the hook receiving means including an eye receiving cavity positioned across the prescribed leader path;
   an elongated actuation member having opposed aligning and cutting ends pivotally mounted in the longitudinal cavity for moving between an actuated position and an unactuated position;
   an alignment punch responsive to the movement of the elongated actuation member to intersect the hook receiving means, the alignment punch being aligned with the prescribed path when the elongated actuation member is in the actuated position, with the alignment punch passing through the eye for accurately centering the eye with respect to the prescribed path; and
   a releasable eye gripping means movably mounted on the body and separate from the alignment punch for positively locking the eye within the receiving cavity of the hook receiving means as the centered eye is threaded.

9. The fishhook threader for threading leader through the eye of a fishhook of claim 8, further comprising:
   a leader cutter having a first jaw mounted to the cutting end of the body and a second jaw mounted to the cutting end of the elongated actuation member, the second jaw movable from an open position away from the first jaw to a closed position against the first jaw for cutting the leader.

10. A fishhook threader for theading leader through the eye of a fishook comprising:
    an elongated body, having a threading end and a cutting end, the body having (1) a slotted aperture through the threading end for guiding the leader along a prescribed leader path through the interior of the body at the threading end and (2) a longitudinal cavity formed therethrough;
    hook receiving means formed in the threading end of the body to receive and orient the eye transversely across the prescribed leader path;
    an elongated actuation member having opposed aligning and cutting ends pivotally mounted in the cavity for moving between an actuated position and an unactuated position;
    an alignment punch responsive to the movement of the elongated actuation member to intersect the hook receiving means aligned with the prescribed path when the elongated actuation member is in the actuated position, with the alignment punch passing through the eye for accurately centering the eye with respect to the prescribed path;
    an eye gripping means for releaseably holding the eye in a stationary position within the hook receiving means as the centered eye is threaded; and
    a manual release button movably mounted to the body having a first end protruding from the body and a second end operatively connected to the eye gripping means for moving the eye grippng means away from the hook receiving means to permit the insertion or release of the eye from the aligned position.

11. A fishhook threader for threading leader through the eye of a fishhook comprising:
    an elongated body, having a threading end and a cutting end, the body having (1) a slotted aperture through the threading end for guiding the leader along a prescribed leader path through the interior of the body at the threading end and (2) a longitudinal cavity formed therethrough;
    hook receiving means formed in the threading end of the body to receive and orient the eye transversely across the prescribed leader path;
    an elongated actuation member having opposed aligning and cutting ends pivotally mounted in the cavity for moving between an actuated position and an unactuated position;
    an alignment punch responsive to the movement of the elongated actuation member to intersect the hook receiving means aligned with the prescribed path when the elongated actuation member is in the actuated position, with the alignment punch passing through the eye for accurately centering the eye with respect to the prescribed path;
    an eye gripping means for releasably holding the eye in a stationary position within the hook receiving means as the centered eye is threaded; and
    biasing means for normally positioning the alignment punch clear of the hook receiving means.

* * * * *